(12) United States Patent  (10) Patent No.: US 7,540,213 B2
Kerber et al.  (45) Date of Patent: Jun. 2, 2009

(54) GEARSHIFT LEVER

(75) Inventors: Alfred Kerber, Dornwang (DE); Winfried Gandorfer, Laberweinting (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 686 days.

(21) Appl. No.: 11/272,441

(22) Filed: Nov. 10, 2005

(65) Prior Publication Data

US 2007/0101819 A1  May 10, 2007

(30) Foreign Application Priority Data

Nov. 12, 2004  (DE) ........................ 10 2004 054 781

(51) Int. Cl.
*B60K 17/04* (2006.01)
*B60K 17/12* (2006.01)
*H01H 9/06* (2006.01)

(52) U.S. Cl. .................. 74/473.12; 200/61.88

(58) Field of Classification Search .............. 74/473.12, 74/473.13; 200/61.88, 61.91; 340/456
See application file for complete search history.

(56) References Cited

U.S. PATENT DOCUMENTS 5,481,077 A * 1/1996 Clegg et al. .............. 200/61.88
5,957,001 A 9/1999 Gualtieri et al.
6,738,701 B2 * 5/2004 Wilson ........................ 701/51
6,930,594 B1 * 8/2005 Wang ......................... 340/456
7,139,653 B2 * 11/2006 Ringger et al. ................ 701/51

FOREIGN PATENT DOCUMENTS

DE  100 22 814 A1  9/2001
DE  698 06 680 T2  12/2002

OTHER PUBLICATIONS

Excerpts from "Kraftfahrtechnisches Handbuch" (Automotive Technology Handbook), 25th edition of Robert Bosch GmbH (2003), pp. 1070-1075.

* cited by examiner

*Primary Examiner*—Tisha D Lewis
(74) *Attorney, Agent, or Firm*—Wolf, Greenfield & Sacks, P.C.

(57) ABSTRACT

A gearshift system for a vehicle, such as a motor vehicle includes a gearshift knob in which a plurality of functional and/or control elements are integrated. A gearshift rod is connectable to the gearshift knob. A plurality of functional and/or control elements are connected to an electronic system disposed within the gearshift knob. The electronic system is connectable to an electronic system in the vehicle via a bus that extends along the gearshift rod.

32 Claims, 4 Drawing Sheets

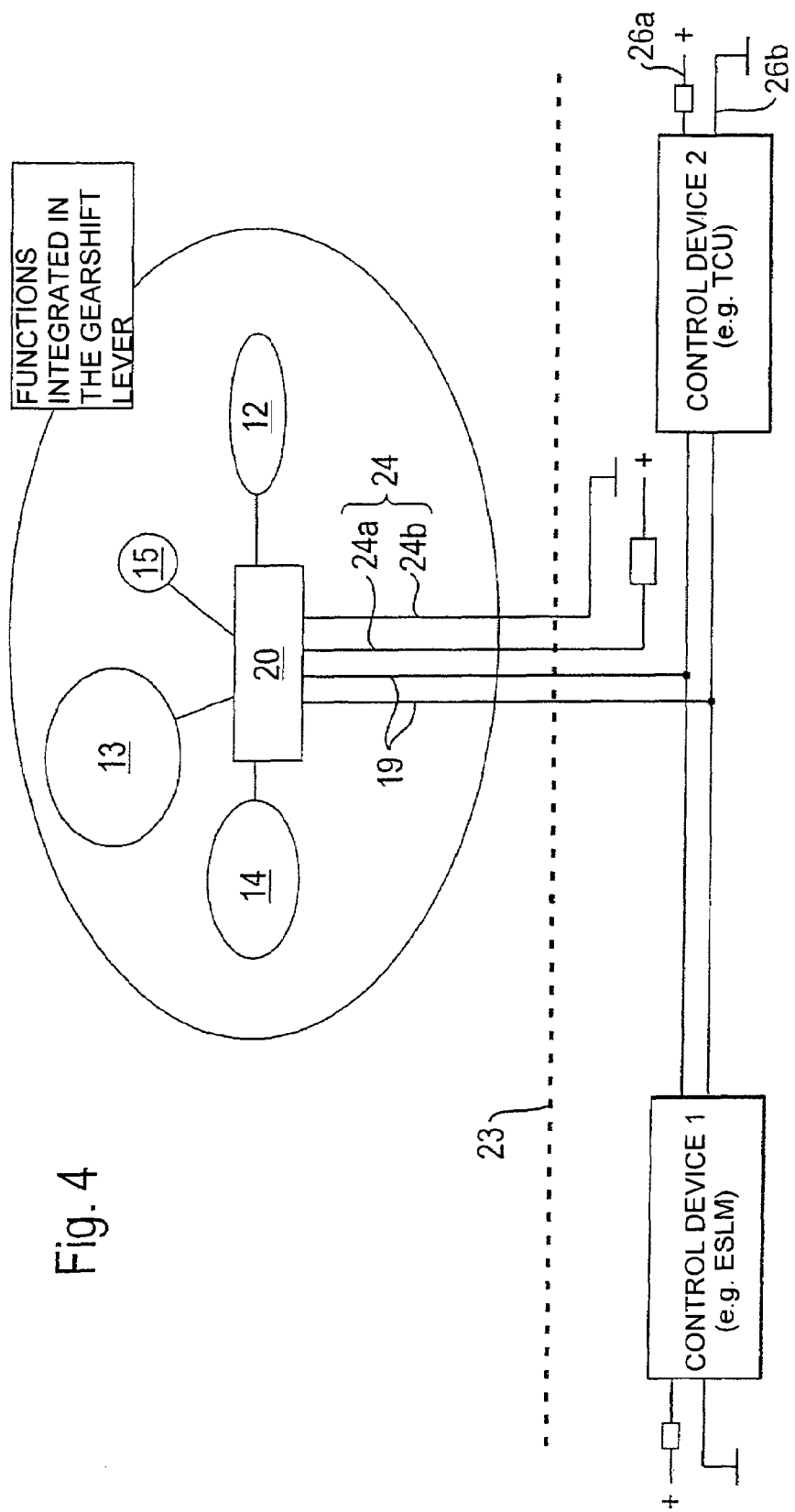

GEARSHIFT LEVER

BACKGROUND

1. Field

Aspects of the invention relate to gearshift levers for vehicles, and more particularly to gearshift lever control arrangements for motor vehicles.

2. Discussion of Related Art

Gearshift levers are known in the art. By way of example, DE 100 02 441 A1 describes one type of gear shift lever. Gearshift knobs that have more than two control and/or functional elements are also known, for example from DE 100 25 357 A1 and FR 2 071 184.

There is a trend in the automotive industry for greater numbers of functional and/or control elements to be integrated into gearshift knobs. As the number of functional and/or control elements is increased, the number of leads required to connect the functional and/or control elements to the remaining electric/electronic system of the vehicle also increases.

The increased number of leads required to connect increased numbers of functional and/or control elements in a gear knob to the remaining electric/electronic system of the vehicle raises design issues. Hollow gearshift rods in motor vehicles may have limited room for the passage of wires, as space in such gearshift rods is often limited by existing designs of the bearing block or by limited space available in a vehicle. When several functional and/or control elements are integrated in the gearshift knob, the required wiring may not fit properly, e.g., inside of the hollow gearshift rod. This may be particularly problematic if the existing cross-section of a gearshift rod is maintained so that the bearing block of the vehicle does not have to be completely redesigned.

Multiple leads may be routed outside of the gearshift rod to the electric/electronic system of the vehicle. However, such a configuration may subject the leads to damage when the gearshift is moved, or when other components rub against the gearshift.

SUMMARY

In one embodiment, a gearshift lever for vehicles is provided. The gearshift lever includes a gearshift knob in which a plurality of functional and/or control elements are integrated; a gearshift rod which is connected to the gearshift knob and which defines a cavity; wherein the plurality of functional and/or control elements are connected to an electronic system in the gearshift knob, further wherein the electronic system in the gearshift knob is connected to an electronic vehicle system via a bus and a supply line that are in the cavity.

In another embodiment, a gearshift system for use in a vehicle is provided. The gearshift system includes a gearshift knob coupleable to a gearshift rod, a plurality of electronic elements operatively disposed on or in the gearshift knob, and an electronic system arranged in the gearshift knob and electrically connected to the electronic elements via a first plurality of leads. An electrical connection is adapted to extend along the gearshift rod. The electrical connection includes a second plurality of leads is connected to the electronic system and is adapted to connect to an electronic vehicle system in the vehicle. The second plurality of leads includes a fewer number of leads than the first plurality of leads.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 4 is a schematic view of yet another embodiment of the invention.

DETAILED DESCRIPTION

Figure 1:
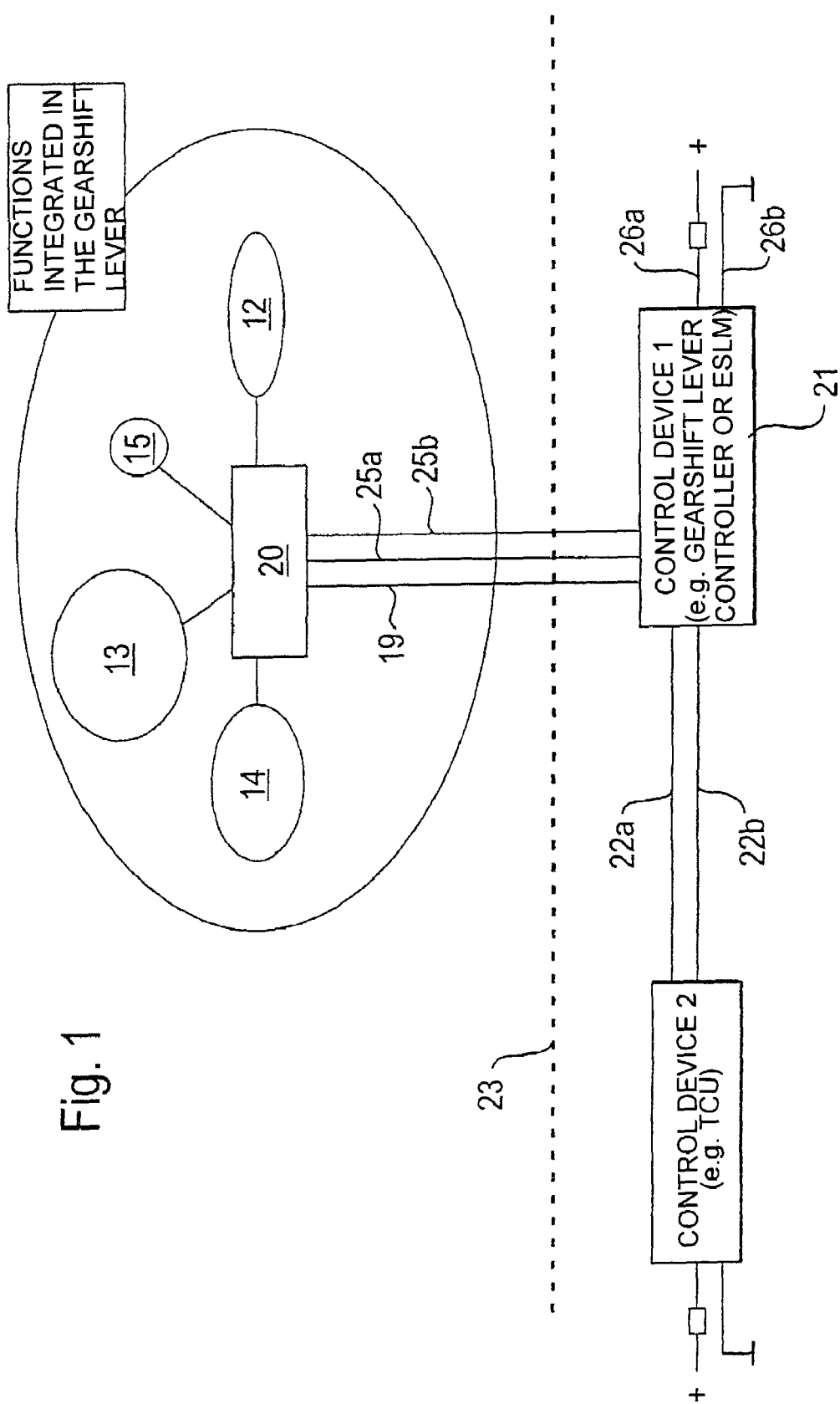
FIG. 1 is a schematic view of an embodiment of the invention.

Embodiments of the present invention reduce the number of leads required to connect the functional and/or control elements (also referred to as electronic elements) to the electronic system of a vehicle, while also allowing an increase in the number of functional and/or control elements that can be accommodated by a gear knob. According to some embodiments, an intelligent, autocontrolling electronic system is arranged in the gearshift knob. The electronic system may establish a connection to the functional and/or control elements and is connected to the remaining electronic system of the vehicle via a bus system. In such embodiments, the bus system replaces individual connections between the functional and/or operation elements of the gear knob and the electronic system of the vehicle.

Embodiments allow the functional and/or control elements to connect to the electronic system of a vehicle through the inside a conventional, hollow, gearshift rod. Providing a connection through the hollow, gearshift rod may prevent damage to the leads, and may also allow the bearing block of conventional gearshift rods to be used without redesign. It should be appreciated that the present invention is not limited to extending the connecting lead through the gearshift rod, as the connecting lead of the autocontrolling system may lie outside the gear shift rod. In such embodiments, it may be desirable to adequately protect the lead.

The term "bus" as used herein encompasses both conventional busses (e.g. CAN or LIN busses) and so-called "powerline communication" connections, where the bus information may be modulated on via the supply leads (+ and −). That is, only two leads, namely + and −, may be needed. In this sense, the term "bus" also may designate serial data transmission to one or more bus leads.

Embodiments of the present invention allow the gearshift lever to accommodate a wide range of numbers and types of functional and/or control elements. In such embodiments, a printed circuit board alone may be adapted, if necessary, to accommodate a different number of elements or different types of elements. The wiring in the gearshift rod may not have to be adapted when changing the number of or type of functional and/or control elements.

Connections between the bus and the electronic vehicle system may occur in many different ways as long as specifications of the bus and the control devices are complied with.

Embodiments of the bus may comprise a LIN (Local Interconnect Network) bus. A LIN bus may be beneficial since it can provide a connection using only three leads, including a supply lead, a bus lead, and a ground lead. Other embodiments can include bus systems which only require one bus lead, such as a one-wire CAN, a BSI (Bit Serial Interface), a K-bus, SPI or an RS232.

In some illustrative embodiments, the electronic vehicle system may comprise a CAN bus. Many motor vehicles may already be equipped with bus systems, like a CAN (Controller Area Network) bus system. CAN is a standard of the International Organization for Standardization (ISO 11898, 11519 and 11992). In embodiments that use a sub-bus connection with three leads (bus lead, supply lead, ground lead), the bus may be connected to the remaining electronic vehicle system (in this case, a CAN bus), via a control device integrated in the CAN bus. The connection does not, however, have to be established to the CAN bus, but may rather be designed differently depending on particular application requirements.

In other embodiments, the connection may also be a CAN bus connection which has four leads. The four leads may include one supply lead, two bus leads, and one ground lead.

In some embodiments, the electronic vehicle system may be connected directly to the CAN bus (if any) of the motor vehicle, without interconnection of a control device. However, it is to be appreciated that other connections are possible, as aspects of the present invention are not limited in this regard. Also, other bus systems may be employed to establish a connection to the functional and/or control elements, as the present invention is not limited in this regard.

In some embodiments, the control elements may comprise a pushbutton, a rotary switch, a toggle switch, a turn ring and/or a knurled ring. Moreover, in some embodiments, the functional elements comprise one or more indicators that display, for example, gear position of the gearshift lever. Greater, fewer or other suitable functional and/or control elements may be employed, as the present invention is not limited in this respect.

The cavity defined by the gearshift rod does not necessarily have to be closed. In some embodiments, the gearshift rod may have a slotted cross-section (e.g. C-shaped). Still, in some embodiments, the cross-section may be circular, square, or polygonal-so as to completely delimit the cavity. As such, the present invention is not limited in this regard.

Figure 2:
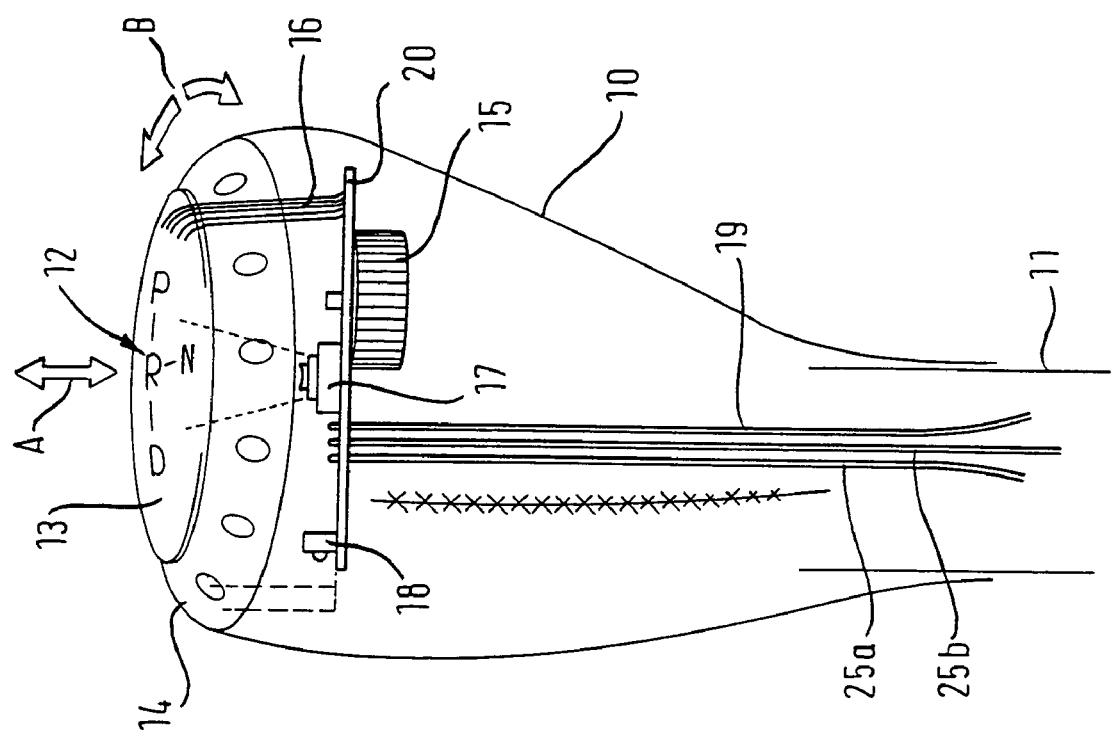
FIG. 2 is a perspective view of a gearshift knob with various components disposed on or in the gearshift knob.

Turn now to the figures, and initially to FIGS. 1 and 2, which show an embodiment of a gearshift lever comprising a gearshift knob 10 connected to a tube-shaped gearshift rod 11, a plurality of functional and/or control elements are integrated in the gearshift knob 10. The control elements include an indicator 12 that displays the gear position of the gearshift lever as functional illumination and effects. The illumination and effects may include a search illumination, such that the gear-shift knob and the corresponding gear positions are visible even at night. The gearshift knob may also include a pushbutton 13, a turn ring 14 and a knurled ring 15. The illustrated pushbutton 13 may be actuated in the direction shown by the double arrow A. The turn ring 14 may be moved in the two directions shown by the double arrow B. Additional functional and/or control elements may also be integrated in the gearshift knob 10, as aspects of the present invention are not limited in this regard.

In illustrative embodiments, the indicator 12 is connected to a circuit board or an electronic system 20 via a plurality of lines 16. The knurled ring 15 may also be connected to the electronic system, as shown in FIG. 2. The pushbutton 13 may be connected to the electronic system 20 via a pushbutton element 17. Similarly, the turn ring 14 may be connected to the electronic system via a connection member 18. A multiplicity of elements, leads and connections may be used to establish a connection to the various functional and/or control elements. To directly connect the functional and/or control elements to the electric/electronic system of the vehicle, a large number of leads may have to be routed through the gearshift rod 11. However, the cross-section of some gearshift rods may not be able to accommodate greater numbers of leads. By way of example, some gearshift rods may not accommodate more than four, or more than three leads. However, it should be appreciated that the present invention is not limited to routing the leads through the gearshift rod.

Aspects of the present invention use an electronic system 20 that comprises supply lines and a line for a bus system to enable a limited number of lines between the functional and/or control elements to the electric/electronic control system of the vehicle. In one aspect, the use of the electronic system 20 enables routing of the leads required for wiring through the tube-shaped gearshift rod 11. In the illustrated embodiment, the electronic system 20 is connected to the gearshift lever controller 21 via a LIN bus. The connection consists of bus and supply leads. As illustrated, the connection comprises three leads including a ground lead 25b, a supply lead 25a and the LIN bus lead 19. As previously described, the present invention is not limited to a LIN bus, and may employ other bus systems to connect the electronic system 20 to the remaining electronic vehicle system and to establish a connection to the functional and/or control elements of the gear knob.

As can be seen from FIG. 1, the LIN bus 19 may be connected to the remaining electronic system of the motor vehicle via a CAN bus (Controller Area Network). A gearshift lever controller or a control device 21 in the CAN bus may enable such a connection. In embodiments that use a CAN bus instead of the LIN bus 19, the controller 21 may be omitted and the CAN bus may be integrated directly into the CAN bus of the vehicle. In the embodiment of FIG. 1, the connection of the electronic gearshift lever control system to the remaining electric/electronic system of the motor vehicle may include four leads 22a/b and 26a/b (two bus leads 22a and 22b, one supply lead 26a and one ground lead 26b) that run in a tunnel cover of the motor vehicle. However, other numbers of leads are possible, as aspects of the invention are not limited in this regard.

Some embodiments do not include a CAN bus, as aspects of the invention are not limited in this regard. A CAN bus is also not required for the electronic vehicle system. In some embodiments, a LIN bus 19 may be connected to the remaining electronic vehicle system differently, as the invention is not limited in this respect.

Figure 3:
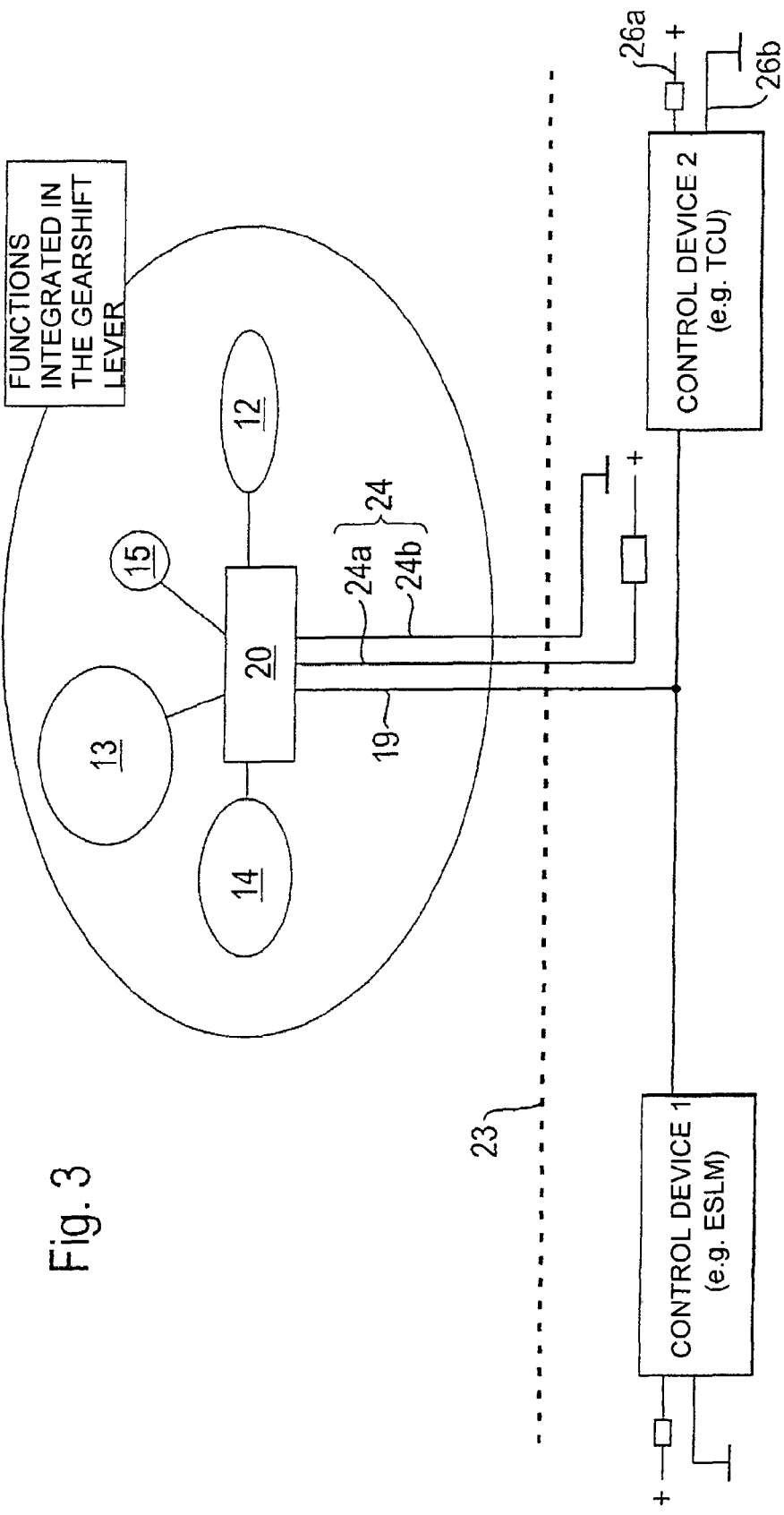
FIG. 3 is a schematic view of another embodiment of the invention.

In some embodiments, a connection may be established such that the electronic gearshift knob system is able to communicate with one or more other electronic components via the bus. In some embodiments, the electronic gearshift knob system 20 may be connected to the gearshift lever controller in a direct point-to-point connection via a LIN bus (sub-bus system), as described herein with regard to the embodiment of FIG. 1. In the embodiment of FIG. 1, the gearshift lever controller is integrated into a CAN bus system. In other embodiments, like the embodiment of FIG. 3, it may be possible to connect the electronic gearshift knob system to a more distant component, such as a central or transmission control unit, which may also handle control of the electronic gearshift knob system. Still, additional elements, such as an electronic selector lever module (ESLM), a transmission control unit (TCU), an electronic gearshift knob system, a selector lever cover, and the like may be connected to the bus system. As mentioned herein, two leads of the connection shown in the Figures may be supply leads. Alternately, one may be a supply lead and one a ground lead (+, ground). As shown in FIG. 3, it may also be possible for only the bus or the sub-bus system, i.e. the bus lead, to be connected to the control device 1, the control device 2 and the electronic gearshift lever system. In such embodiments, the supply leads may connect to the power supply in a different way and the control devices 1 and 2 may also be connected to the power supply in a different way.

Some embodiments may also use bus systems that are different from those represented in FIGS. 1 and 3. In different bus systems, the connection to the electronic components may be adapted differently. In such embodiments, the specifications of the bus system used should be satisfied with regard to the control devices that are used in the gear knob.

The embodiment of FIG. 4 shows another connection of the bus system or bus to the remaining electronic vehicle system. As compared to the bus systems of FIGS. 1 and 3, the embodiment in FIG. 4 uses a two-wire bus to establish a connection to the remaining electronic vehicle system. The connection consists of four leads, including two bus leads, one supply lead and one ground lead. The two bus leads communicate with the remaining electronic vehicle system, thus enabling the control of the electronic gearshift lever system to be handled by the control device 2 (e.g. TCU) or the control device 1 (e.g. ESLM). It is to be appreciated that the electric connection via the supply lead and the ground lead may also be established in a different way.

Various embodiments of the invention provide a connection to functional and/or control elements of a gear knob, such that wiring may run through the interior of a hollow gearshift rod 11. Such embodiments may be suitable in some situations and may prevent the wiring leads from being damaged by movement of the gearshift lever. Moreover, embodiments of the bus system allow a large number of functional and/or control elements to be used in the gearshift knob. Embodiments of the present invention provide a very flexible gearshift knob design. Only the circuit board or the electronic system 20 may need to be exchanged to accommodate additional or different functional and/or control element. In many embodiments, the connection to the electronic system 20 via the bus system may remain the same when elements in the gear knob are changed or added.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A gearshift lever for vehicles, the gearshift lever comprising:
a gearshift knob in which a plurality of functional and/or control elements are integrated;
a gearshift rod which is connected to the gearshift knob and which defines a cavity;
wherein the plurality of functional and/or control elements are connected to an electronic system in the gearshift knob, further wherein the electronic system in the gearshift knob is connected to an electronic vehicle system via a bus and a supply line that are in the cavity and the connection between the electronic system in the gearshift knob and the electronic vehicle system consists of three leads, the vehicle including a CAN bus and the bus in the cavity connected to the CAN bus via a control device integrated in the CAN bus to connect the electronic system to the electronic vehicle system.

2. The gearshift lever according to claim 1, wherein the bus is a LIN bus.

3. The gearshift lever according to claim 1, wherein the bus is a one-wire CAN, BSS, K-bus, SPI or RS 232.

4. The gearshift lever according to claim 1, wherein the bus is a CAN bus.

5. The gearshift lever according to claim 1, wherein the bus in the cavity is connected directly to the CAN bus to connect the electronic system to the electronic vehicle system.

6. The gearshift lever according to claim 1, wherein the control elements comprise a pushbutton, a turn ring, a toggle switch and/or a knurled ring.

7. The gearshift lever according to claim 1, wherein the functional elements comprise one or more indicators.

8. The gearshift lever according to claim 1, wherein the gearshift rod has a circular, square, polygonal or open cross-section.

9. The gearshift lever according to claim 2, wherein the bus is connected to the CAN bus via a control device integrated in the CAN bus to connect the electronic system to the electronic vehicle system.

10. The gearshift lever according to claim 3, wherein the bus is connected to the CAN bus via a control device integrated in the CAN bus in order to connect the electronic system to the electronic vehicle system.

11. The gearshift lever according to claim 4, wherein the bus is connected directly to the CAN bus to connect the electronic system to the electronic vehicle system.

12. A gearshift system for use in a vehicle, the gearshift system comprising:
a gearshift knob coupleable to a gearshift rod;
a plurality of electronic elements operatively disposed on or in the gearshift knob;
an electronic system arranged in the gearshift knob and electrically connected to the electronic elements via a first plurality of leads; and
an electrical connection adapted to extend along the gearshift rod, the electrical connection comprising a second plurality of leads connected to the electronic system and adapted to connect to an electronic vehicle system in the vehicle, wherein the second plurality of leads comprises a fewer number of leads than the first plurality of leads.

13. The system according to claim 12, wherein the second plurality of leads consists of two leads.

14. The system according to claim 12, wherein the second plurality of leads consists of three leads.

15. The system according to claim 12, wherein the second plurality of leads consists of four leads.

16. The system according to claim 12, wherein the bus is a LIN bus.

17. The system according to claim 12, wherein the bus is selected from a group consisting of: a one-wire CAN, a BSS, a K-bus, an SPI, and an RS 232.

18. The system according to claim 12, wherein the vehicle comprises a CAN bus, wherein the bus is adapted to be connected to the CAN bus via a control device integrated in the CAN bus in order to connect the electronic system to the electronic vehicle system.

19. The system according to claim 12, in combination with the gearshift rod, wherein the gearshift rod is hollow and wherein the electrical connection extends within the gearshift rod.

20. A gearshift lever for vehicles, the gearshift lever comprising:

a gearshift knob in which a plurality of functional and/or control elements are integrated; and a gearshift rod which is connected to the gearshift knob and which defines a cavity;

wherein the plurality of functional and/or control elements are connected to an electronic system in the gearshift knob, further wherein the electronic system in the gearshift knob is connected to an electronic vehicle system via a LIN bus and a supply line that are in the cavity, the vehicle including a CAN bus, the LIN bus connected to the CAN bus via a control device integrated in the CAN bus to connect the electronic system to the electronic vehicle system.

21. The gearshift lever according to claim 20, wherein the connection between the electronic system in the gearshift knob and the electronic vehicle system consists of three leads.

22. The gearshift lever according to claim 20, wherein the connection between the electronic system in the gearshift knob and the electronic vehicle system consists of four leads.

23. The gearshift lever according to claim 20, wherein the control elements comprise a pushbutton, a turn ring, a toggle switch and/or a knurled ring.

24. The gearshift lever according to claim 20, wherein the functional elements comprise one or more indicators.

25. The gearshift lever according to claim 20, wherein the gearshift rod has a circular, square, polygonal or open cross-section.

26. A gearshift lever for vehicles, the gearshift lever comprising:

a gearshift knob in which a plurality of functional and/or control elements are integrated; and a gearshift rod which is connected to the gearshift knob and which defines a cavity;

wherein the plurality of functional and/or control elements are connected to an electronic system in the gearshift knob, further wherein the electronic system in the gearshift knob is connected to an electronic vehicle system via a bus and a supply line that are in the cavity, the vehicle including a CAN bus and the bus in the cavity connected to the CAN bus via a control device integrated in the CAN bus in order to connect the electronic system to the electronic vehicle system;

wherein the bus in the cavity is selected from a group consisting of a one-wire CAN, BSS, K-bus, SPI and an RS 232 bus.

27. The gearshift lever according to claim 26, wherein the connection between the electronic system in the gearshift knob and the electronic vehicle system consists of three leads.

28. The gearshift lever according to claim 27, wherein the vehicle comprises a CAN bus and further wherein the bus is connected to the CAN bus via a control device integrated in the CAN bus to connect the electronic system to the electronic vehicle system.

29. The gearshift lever according to claim 27, wherein the connection between the electronic system in the gearshift knob and the electronic vehicle system consists of four leads.

30. The gearshift lever according to claim 27, wherein the control elements comprise a pushbutton, a turn ring, a toggle switch and/or a knurled ring.

31. The gearshift lever according to claim 27, wherein the functional elements comprise one or more indicators.

32. The gearshift lever according to claim 27, wherein the gearshift rod has a circular, square, polygonal or open cross-section.

* * * * *